United States Patent [19]
Locke

[11] 3,794,345
[45] Feb. 26, 1974

[54] ADJUSTABLY MOUNTED CAMPER STEP ASSEMBLY

[76] Inventor: Oscar Vernon Locke, 913 Evans St., Milton-Freewater, Oreg. 97862

[22] Filed: June 8, 1972

[21] Appl. No.: 261,095

[52] U.S. Cl..................... 280/163, 182/92, 248/295
[51] Int. Cl................................................ B60n 3/02
[58] Field of Search ...... 280/163, 164, 166; 182/92, 182/93, 82; 248/295, 16, 287, 298

[56] References Cited
UNITED STATES PATENTS

| | | | |
|---|---|---|---|
| 3,017,949 | 1/1962 | Harlan | 182/92 |
| 2,335,896 | 12/1943 | Anderson | 248/295 |

*Primary Examiner*—Robert R. Song
*Attorney, Agent, or Firm*—Klarquist, Sparkman, Campbell, Leigh, Hall & Whinston

[57] ABSTRACT

A camper step having dual function mounting means so that it can be mounted on a mounting bar selectively in either of several horizontally displaced positions or various vertical positions. The bar has mounting means so that it can be mounted in a left hand projecting position for left hand doors, or a right hand projecting position for right hand doors. The two mounting means are so related as to permit center mounting of the step member.

6 Claims, 4 Drawing Figures

PATENTED FEB 26 1974 3,794,345
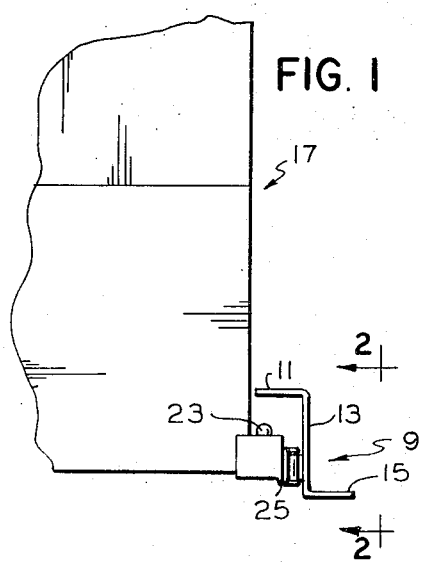
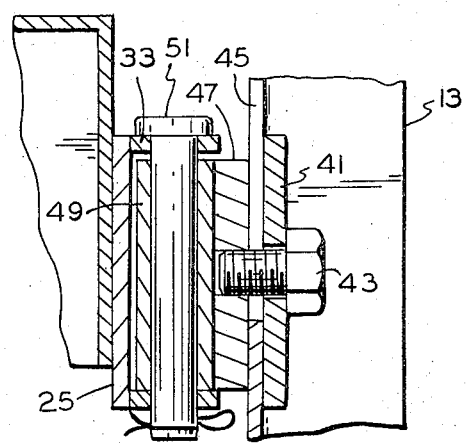
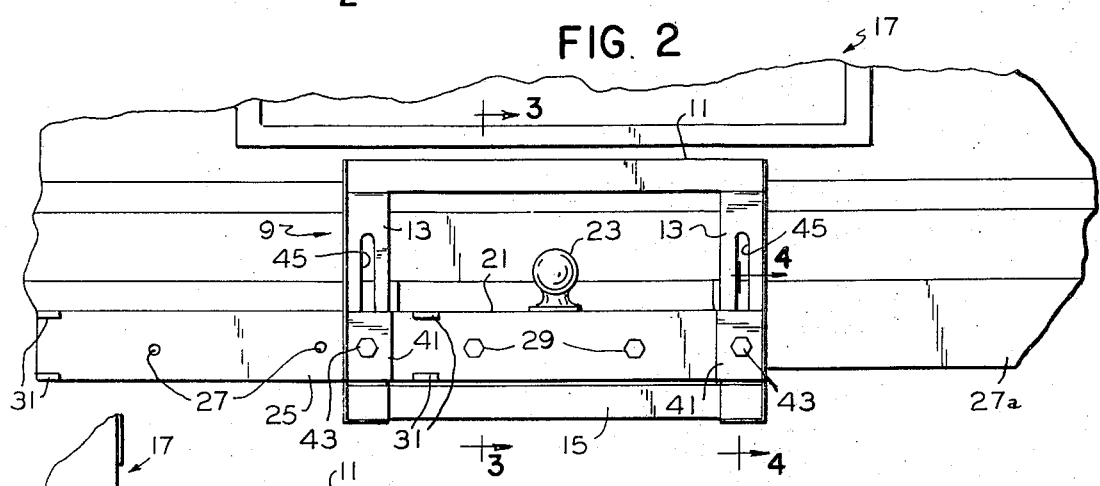
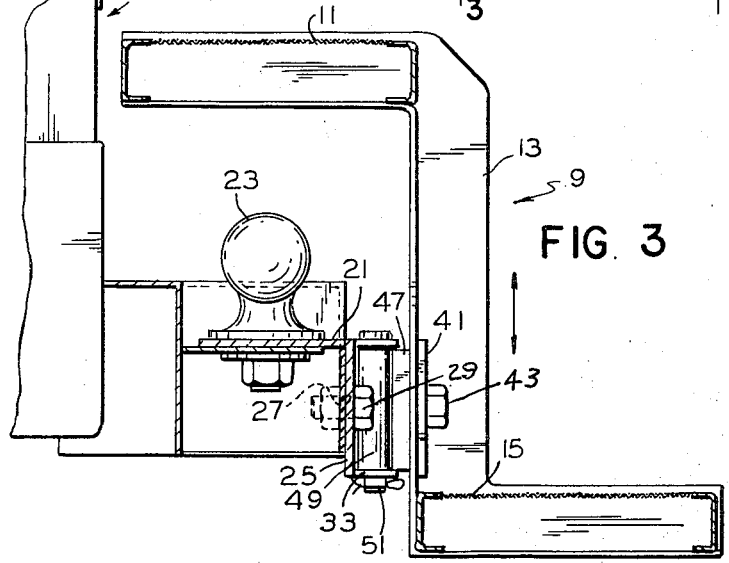

ADJUSTABLY MOUNTED CAMPER STEP ASSEMBLY

This invention relates to camper step assemblies and particularly to the mounting arrangement for a camper step member.

A main object of the invention is to provide a simple mounting arrangement permitting the step member to be located in a number of horizontal and vertical positions so that it can be adjusted to fit a wide variety of campers.

Another object is to provide a mounting arrangement including a mounting bar which can be mounted in a left projecting position or a right projecting position, and a step member mountable either left or right on the bar, wherein the relationship is such that the step member can not only be mounted for a left camper door or a right camper door, but also a center camper door.

Various other objects of the invention will be apparent from the following description taken in connection with the accompanying drawings, wherein:

FIG. 1 is a side elevational view of my camper step assembly, shown as mounted on a camper vehicle;

FIG. 2 is a rear elevational view of the assembly on an enlarged scale;

FIG. 3 is a vertical sectional view taken along line 3—3 of FIG. 2 on an enlarged scale;

FIG. 4 is a vertical sectional view taken along line 4—4 of FIG. 3 on an enlarged scale.

Referring to the drawings, the step device comprises a rigid generally Z-shaped step member 9 (FIG. 1) including an upper step 11, the front edge of which is rigidly secured by a pair of uprights 13 to the rear edge of a lower step 15.

The step member 9 is adjustably secured to the rear of a camper 17 by a mounting arrangement which includes an angle member 21 (FIG. 3) having a hole to pass the shank of the towing knob 23. The latter fixedly secures the angle member to the rear of the camper vehicle.

A mounting bar 25 (FIG. 2) extends parallel to the rear bumper 27a of the camper and has two pairs of mounting holes 27, one pair located adjacent the left end portion of the bar while the other is located adjacent the right end portion. Bolts 29 (FIGS. 2 and 3) pass through a pair of the holes 27 and through holes in the angle member 21 to secure the bar to the vertical flange of the angle member 21 in either a left projecting position for left opening camper doors, or in a right projecting position for right opening doors. In either position, the step member 9 can be located in line with a center door, as will be explained hereinafter.

The bar 25 has four pairs of ears, two pair being the left hand ears and numbered 31 (FIG. 2) and the other two pair being the right hand ears and numbered 33 (FIG. 4). The ears 31 are centered relative to the left holes 27, while the ears 33 are centered relative to the right holes, and selectively receive mounting portions of the step member 9.

Such mounting portions comprise a pair of pads 41 (FIG. 4) which are adjustably held against the front faces of uprights 13 by bolts 43. The bolts pass through vertical slots 45 in the uprights and thread into tube bosses 47 to clamp the uprights in a desired position of vertical adjustment on the bar.

Each boss has a vertical tube 49 of a length to fit between a pair of ears on the bar 25. A pair of headed pins or bolts 51 detachably mount the camper step on the ears, each pin sliding down through the associated ears and tube, and being retained in place by a cotter pin or equivalent retaining element.

It is evident that the above described mounting arrangements enable the camper step member 9 to be located at various positions both horizontally and vertically to enable the steps to be properly located on a wide variety of campers, despite different door mountings and heights. Even a center location of the step member 9 can be achieved. Suppose the door is centrally located in the rear of the camper. The bar 25 can be mounted on the angle 21 through its right hand holes 27 (as shown in FIG. 2) so that the bar 25 projects to the left. However, by mounting the step member 9 in the right hand ears 33 (as shown) the step member 9 is located centrally (as shown). The same result can be obtained by mounting the bar in its left hand holes 27 and the step member in the left hand ears 31. Obviously, the step member can be located in line with a door located to the left, by merely mounting the bar 25 as shown in FIG. 2, but mounting the step member 9 in ears 31. By mounting the bar in the left holes 27 and the step member in the ears 33, the step member can be located in line with a right located camper door.

Instead of a tube and pin arrangement, a reduced-end pin could be used. It has a reduced diameter lower end and upper end, each about the diameter of the shank of pin 51, and a midportion about the diameter of the tube 49. The fit of such reduced ends in the ears would be loose enough, and the upper shoulder of the midportion space sufficiently below the upper ear, as to enable the step member to be raised to clear the lower reduced ends from the confinement of the ears, after which the step member could be tilted to move the lower ends rearwardly and then downwardly to withdraw the upper reduced ends from the upper ears. To permit this movement, the upper step 11 might have to be pivotally mounted on the upper ends of the uprights 13, in those instances where there is not much space between the upper step and the bumper or the underlying structure.

Having described the invention in what is considered to be the preferred embodiment thereof, it is desired that it be understood that the invention is not to be limited other than by the provisions of the following claims.

I claim:

1. A camper step assembly including:
    a step member,
    an elongate mounting member,
    first mounting means for detachably securing the elongate mounting member to a camper vehicle selectively in either of two horizontal positions, one in which the mounting member projects more to the left of the centerline of the vehicle than to the right, and the other in which the mounting member projects more to the right of such centerline than to the left,
    second mounting means for mounting the step member on the left portion thereof or on the right portion thereof, said first mounting means comprising a mounting piece to be fixedly secured to the rear of the camper vehicle,
    said elongate mounting member having two pairs of mounting holes, one in the right hand portion of such elongate mounting means and the other in the left hand, and bolts for securing the elongate mounting means to the mounting piece selectively in one pair of holes or the other.

2. The camper step assembly of claim 1 in which the second mounting means comprises four pairs of ears, vertical tubes carried by the step member for selective alignment with said ears, retaining pins for said ears and tubes, and means provided for vertically adjusting the position of the tubes relative to the step member.

3. The camper step assembly including:

a step member, an elongate mounting member, first mounting means for detachably securing the elongate mounting member to a camper vehicle selectively in either of two horizontal positions, one in which the mounting member projects more to the left of the centerline of the vehicle than to the right, and the other in which the mounting member projects more to the right of such centerline than to the left, second mounting means for mounting the step member on the mounting member on the left portion thereof or on the right portion thereof, said second mounting means comprising four pairs of ears, vertical tubes carried by the step member for selective alignment with said ears, and retaining pins for said ears and tubes.

4. The camper step assembly of claim 3 in which means are provided for vertically adjusting the poistion of the tubes relative to the step member.

5. The camper step assembly including:

a step member, an elongate mounting member, first mounting means for detachably securing the elongate mounting member to a camper vehicle selectively in either of two horizontal positions, one in which the mounting member projects more to the left of the centerline of the vehicle than to the right, and the other in which the mounting member projects more to the right of such centerline than to the left, second mounting means for mounting the step member on the mounting member on the left portion thereof or on the right portion thereof, said first mounting means comprising a mounting piece to be permanently secured to the rear of the camper vehicle, said elongate mounting member having two pairs of mounting holes, one in the right hand portion of such elongate mounting member and the other in the left hand, said second mounting means comprising four pairs of ears arranged in sets of two pairs each, said step member having an upper step and a lower step joined by a pair of uprights, each upright having a vertical slot, said second mounting means including a pair of mounting elements simultaneously received by the ears of one set or the ears of the other set, and means for adjustably securing said mounting elements in said slots to attain various vertical adjustments of the step member relative to various camper door heights, said mounting holes being located in such spaced relation to each other and to said ears as to allow said elongate mounting member to be mounted in either of its positions while said step member is mounted in either of said sets of ears without interference between the said bolts and said mounting elements.

6. A camper step assembly including a step member having a vertical element, dual function mounting means for detachably mounting the step member on a support having several pairs of ears, and for mounting the step member for vertical adjustment, said mounting means including a pad slidably engaging one face of said vertical element, a boss member slidably engaging the opposite face of said vertical element, a bolt securing said pad and boss in releasable clamping engagement with said vertical element to variously locate said step member vertically relative to said support, and a mounting element carried by said boss and detachably engaging a pair of ears to facilitate disengagement and relocation relative to said support.

* * * * *